US011108728B1

(12) United States Patent
Boutros et al.

(10) Patent No.: US 11,108,728 B1
(45) Date of Patent: Aug. 31, 2021

(54) FAST DISTRIBUTION OF PORT IDENTIFIERS FOR RULE PROCESSING

(71) Applicant: VMware, Inc., Palo Alto, CA (US)

(72) Inventors: Sami Boutros, Union City, CA (US); W. Andrew Lambeth, San Mateo, CA (US); Jayant Jain, Cupertino, CA (US); Mani Kancherla, Cupertino, CA (US)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 16/938,697

(22) Filed: Jul. 24, 2020

(51) Int. Cl.
G06F 15/16 (2006.01)
H04L 29/12 (2006.01)
H04L 29/06 (2006.01)

(52) U.S. Cl.
CPC ........ *H04L 61/103* (2013.01); *H04L 61/2069* (2013.01); *H04L 61/6022* (2013.01); *H04L 63/20* (2013.01)

(58) Field of Classification Search
CPC ............... H04L 61/103; H04L 61/2069; H04L 61/6022; H04L 63/20
(Continued)

(56) References Cited

U.S. PATENT DOCUMENTS 5,826,051 A 10/1998 Porter et al.
5,950,195 A 9/1999 Stockwell et al.
(Continued)

FOREIGN PATENT DOCUMENTS

EP 2748750 A1 7/2014
JP 2016514295 A 5/2016
(Continued)

OTHER PUBLICATIONS

Author Unknown, "Cisco Identity-Based Firewall Security," Month Unknown 2011, 2 pages, Cisco Systems, Inc.
(Continued)

*Primary Examiner* — Ruolei Zong
(74) *Attorney, Agent, or Firm* — Adeli LLP

(57) ABSTRACT

Some embodiments of the invention provide a method for implementing a logical network with one or more logical forwarding elements (LFEs), each with multiple logical ports. Each LFE in some embodiments is implemented by several physical forwarding elements (PFEs) operating on several devices. On a host computer executing a particular machine connected to a PFE implementing a particular LFE, the method identifies an address discovery message associating a particular network address (e.g., a layer 2 (L2) address or media access control (MAC) address) of the particular machine with a another network address (e.g., a layer 3 (L3) or an Internet Protocol (IP) address) of the particular machine. The method identifies an LFE logical port associated with the particular machine, stores in an encapsulation header an identifier that identifies this port, encapsulates the address discovery data message with this encapsulation header, and then forwards the encapsulated message to a set of one or more devices implementing the LFE. Each device in the set of devices extracts the logical port identifier from the encapsulation header and stores this logical port identifier for use in processing data messages associated with the particular machine.

20 Claims, 6 Drawing Sheets

(58) Field of Classification Search
USPC .................................................... 709/245
See application file for complete search history.

(56) References Cited

U.S. PATENT DOCUMENTS

| | | |
|---|---|---|
| 6,363,477 B1 | 3/2002 | Fletcher et al. |
| 6,430,188 B1 | 8/2002 | Kadambi et al. |
| 6,496,935 B1 | 12/2002 | Fink et al. |
| 6,781,990 B1 | 8/2004 | Puri et al. |
| 6,880,089 B1 | 4/2005 | Bommareddy et al. |
| 7,055,173 B1 | 5/2006 | Chaganty et al. |
| 7,349,382 B2 | 3/2008 | Marimuthu et al. |
| 7,543,054 B1 | 6/2009 | Bansod et al. |
| 7,639,613 B1 | 12/2009 | Ghannadian et al. |
| 7,818,452 B2 | 10/2010 | Matthews et al. |
| 7,843,843 B1 | 11/2010 | Papp, III et al. |
| 7,948,986 B1 | 5/2011 | Ghosh et al. |
| 8,031,599 B2 | 10/2011 | Duffield et al. |
| 8,032,933 B2 | 10/2011 | Turley et al. |
| 8,095,662 B1 | 1/2012 | Lappas et al. |
| 8,190,767 B1 | 5/2012 | Maufer et al. |
| 8,365,294 B2 | 1/2013 | Ross |
| 8,381,209 B2 | 2/2013 | Reumann et al. |
| 8,418,249 B1 | 4/2013 | Nucci et al. |
| 8,484,739 B1 | 7/2013 | Seshadri |
| 8,655,307 B1 | 2/2014 | Walker et al. |
| 8,660,129 B1 | 2/2014 | Brendel et al. |
| 8,953,453 B1 | 2/2015 | Xiao et al. |
| 8,966,035 B2 | 2/2015 | Casado et al. |
| 9,009,836 B1 | 4/2015 | Yarykin et al. |
| 9,015,823 B2 | 4/2015 | Koponen et al. |
| 9,215,214 B2 | 12/2015 | Bansal et al. |
| 9,317,696 B2 | 4/2016 | Ayres et al. |
| 9,413,667 B2 | 8/2016 | Beliveau et al. |
| 9,444,841 B2 | 9/2016 | Feroz et al. |
| 9,565,202 B1 | 2/2017 | Kindlund et al. |
| 9,596,135 B1 | 3/2017 | Thomas et al. |
| 9,762,619 B1 | 9/2017 | Vaidya et al. |
| 9,891,940 B2 | 2/2018 | Feroz et al. |
| 9,948,611 B2 | 4/2018 | Kumar et al. |
| 9,996,697 B2 | 6/2018 | Mahaffey et al. |
| 9,998,955 B1 | 6/2018 | MacCarthaigh |
| 10,033,693 B2 | 7/2018 | Sengupta et al. |
| 10,228,959 B1 | 3/2019 | Anderson et al. |
| 10,324,746 B2 | 6/2019 | Kumar et al. |
| 10,333,983 B2 | 6/2019 | Vaidya et al. |
| 10,503,536 B2 | 12/2019 | Gunda |
| 10,581,960 B2 | 3/2020 | Gunda et al. |
| 10,606,626 B2 | 3/2020 | Feroz et al. |
| 10,609,160 B2 | 3/2020 | Poon et al. |
| 10,715,607 B2 | 7/2020 | Poon et al. |
| 10,778,651 B2 | 9/2020 | Gunda et al. |
| 10,798,058 B2 | 10/2020 | Sengupta et al. |
| 10,802,857 B2 | 10/2020 | Gunda et al. |
| 10,802,858 B2 | 10/2020 | Gunda |
| 10,802,893 B2 | 10/2020 | Chanda et al. |
| 10,803,173 B2 | 10/2020 | Gunda et al. |
| 10,805,332 B2 | 10/2020 | Gunda et al. |
| 10,812,451 B2 | 10/2020 | Gunda et al. |
| 10,862,773 B2 | 12/2020 | Chanda et al. |
| 2002/0116523 A1 | 8/2002 | Warrier et al. |
| 2002/0122422 A1 | 9/2002 | Kenney et al. |
| 2003/0005118 A1 | 1/2003 | Williams |
| 2003/0093481 A1 | 5/2003 | Mitchell et al. |
| 2003/0093672 A1 | 5/2003 | Cichowlas |
| 2004/0049701 A1 | 3/2004 | Pennec et al. |
| 2004/0098620 A1 | 5/2004 | Shay |
| 2004/0117407 A1 | 6/2004 | Kumar et al. |
| 2004/0162901 A1 | 8/2004 | Mangipudi et al. |
| 2005/0080898 A1 | 4/2005 | Block |
| 2005/0114711 A1 | 5/2005 | Hesselink et al. |
| 2005/0198125 A1 | 9/2005 | Beck et al. |
| 2005/0257244 A1 | 11/2005 | Joly et al. |
| 2005/0286457 A1 | 12/2005 | Foster et al. |
| 2006/0092861 A1 | 5/2006 | Corday et al. |
| 2006/0109852 A1* | 5/2006 | Hadjiahmad ....... H04L 12/5601 370/395.54 |
| 2007/0061492 A1 | 3/2007 | Riel |
| 2007/0101432 A1 | 5/2007 | Carpenter |
| 2007/0143851 A1 | 6/2007 | Nicodemus et al. |
| 2008/0059474 A1 | 3/2008 | Lim |
| 2008/0072305 A1 | 3/2008 | Casado et al. |
| 2008/0267177 A1 | 10/2008 | Johnson et al. |
| 2008/0289028 A1 | 11/2008 | Jansen et al. |
| 2008/0298274 A1 | 12/2008 | Takashige et al. |
| 2008/0301630 A1 | 12/2008 | Arnold et al. |
| 2008/0316922 A1 | 12/2008 | Riddle et al. |
| 2008/0320550 A1 | 12/2008 | Strassner et al. |
| 2009/0007251 A1 | 1/2009 | Abzarian et al. |
| 2009/0055427 A1 | 2/2009 | Kulasingam et al. |
| 2009/0070442 A1 | 3/2009 | Kacin et al. |
| 2009/0129271 A1 | 5/2009 | Ramankutty et al. |
| 2009/0150521 A1 | 6/2009 | Tripathi |
| 2009/0178061 A1 | 7/2009 | Sandoval et al. |
| 2009/0187963 A1 | 7/2009 | Bori |
| 2009/0193497 A1 | 7/2009 | Kikuchi et al. |
| 2009/0228951 A1 | 9/2009 | Ramesh et al. |
| 2009/0235325 A1 | 9/2009 | Dimitrakos et al. |
| 2009/0249470 A1 | 10/2009 | Litvin et al. |
| 2009/0249472 A1 | 10/2009 | Litvin et al. |
| 2009/0254990 A1 | 10/2009 | McGee et al. |
| 2009/0265414 A1 | 10/2009 | Bryan |
| 2009/0281996 A1 | 11/2009 | Liu et al. |
| 2009/0327781 A1 | 12/2009 | Tripathi |
| 2010/0037311 A1 | 2/2010 | He et al. |
| 2010/0100616 A1 | 4/2010 | Bryson et al. |
| 2010/0125667 A1 | 5/2010 | Soundararajan |
| 2010/0138515 A1 | 6/2010 | Ruiz-Velasco et al. |
| 2010/0228819 A1 | 9/2010 | Wei |
| 2010/0251363 A1 | 9/2010 | Todorovic |
| 2011/0016467 A1 | 1/2011 | Kane |
| 2011/0022695 A1 | 1/2011 | Dalal et al. |
| 2011/0055848 A1 | 3/2011 | Vainionpää et al. |
| 2011/0072486 A1 | 3/2011 | Hadar et al. |
| 2011/0103259 A1 | 5/2011 | Aybay et al. |
| 2011/0113467 A1 | 5/2011 | Agarwal et al. |
| 2011/0208960 A1 | 8/2011 | Flood |
| 2011/0225624 A1 | 9/2011 | Sawhney et al. |
| 2011/0238581 A1 | 9/2011 | Severson et al. |
| 2011/0246637 A1 | 10/2011 | Murakami |
| 2012/0158626 A1 | 6/2012 | Zhu et al. |
| 2012/0207174 A1 | 8/2012 | Shieh |
| 2012/0210423 A1 | 8/2012 | Friedrichs et al. |
| 2012/0222114 A1 | 8/2012 | Shanbhogue |
| 2012/0240182 A1 | 9/2012 | Narayanaswamy et al. |
| 2012/0317570 A1 | 12/2012 | Dalcher et al. |
| 2013/0007740 A1 | 1/2013 | Kikuchi et al. |
| 2013/0007879 A1 | 1/2013 | Esteban et al. |
| 2013/0013669 A1 | 1/2013 | Chun et al. |
| 2013/0018994 A1 | 1/2013 | Flavel et al. |
| 2013/0019276 A1 | 1/2013 | Biazetti et al. |
| 2013/0073743 A1 | 3/2013 | Ramasamy et al. |
| 2013/0085880 A1 | 4/2013 | Roth et al. |
| 2013/0163594 A1 | 6/2013 | Sharma et al. |
| 2013/0205366 A1 | 8/2013 | Luna et al. |
| 2013/0219176 A1 | 8/2013 | Akella et al. |
| 2013/0227097 A1 | 8/2013 | Yasuda et al. |
| 2013/0227550 A1 | 8/2013 | Weinstein et al. |
| 2013/0268751 A1 | 10/2013 | Preiss et al. |
| 2013/0332983 A1 | 12/2013 | Koorevaar et al. |
| 2014/0007222 A1 | 1/2014 | Qureshi et al. |
| 2014/0020045 A1 | 1/2014 | Kabat et al. |
| 2014/0040182 A1 | 2/2014 | Gilder et al. |
| 2014/0059163 A1 | 2/2014 | Herbrich et al. |
| 2014/0067779 A1 | 3/2014 | Ojha |
| 2014/0068602 A1 | 3/2014 | Gember et al. |
| 2014/0115578 A1 | 4/2014 | Cooper et al. |
| 2014/0136681 A1 | 5/2014 | Greenlee et al. |
| 2014/0143863 A1 | 5/2014 | Deb et al. |
| 2014/0155043 A1 | 6/2014 | Gell et al. |
| 2014/0173624 A1 | 6/2014 | Kurabayashi |
| 2014/0195666 A1 | 7/2014 | Dumitriu et al. |
| 2014/0215226 A1 | 7/2014 | Litty et al. |
| 2014/0226820 A1 | 8/2014 | Chopra et al. |

(56) References Cited

U.S. PATENT DOCUMENTS

| | | |
|---|---|---|
| 2014/0230008 A1 | 8/2014 | Feroz et al. |
| 2014/0237119 A1 | 8/2014 | Chung et al. |
| 2014/0281030 A1 | 9/2014 | Cui et al. |
| 2014/0282539 A1 | 9/2014 | Sonnek |
| 2014/0282855 A1 | 9/2014 | Clark et al. |
| 2015/0009995 A1* | 1/2015 | Gross, IV ........... H04L 12/4633 370/392 |
| 2015/0012964 A1 | 1/2015 | Xie et al. |
| 2015/0067818 A1 | 3/2015 | Molander et al. |
| 2015/0082301 A1 | 3/2015 | Garg et al. |
| 2015/0096007 A1 | 4/2015 | Sengupta et al. |
| 2015/0106438 A1 | 4/2015 | Fan et al. |
| 2015/0121061 A1 | 4/2015 | Goyal et al. |
| 2015/0134822 A1 | 5/2015 | Bhagwat et al. |
| 2015/0154293 A1 | 6/2015 | Lu |
| 2015/0163117 A1 | 6/2015 | Lambeth et al. |
| 2015/0169345 A1 | 6/2015 | DeCusatis et al. |
| 2015/0172208 A1 | 6/2015 | DeCusatis et al. |
| 2015/0229656 A1 | 8/2015 | Shieh |
| 2015/0269383 A1 | 9/2015 | Lang et al. |
| 2015/0350807 A1 | 12/2015 | Andrews et al. |
| 2015/0355231 A1 | 12/2015 | Zhang et al. |
| 2015/0358344 A1 | 12/2015 | Mumcuoglu et al. |
| 2015/0379279 A1 | 12/2015 | Feroz et al. |
| 2015/0381578 A1 | 12/2015 | Thota et al. |
| 2016/0057014 A1* | 2/2016 | Thakkar ............... G06F 9/45558 709/223 |
| 2016/0057167 A1 | 2/2016 | Bach |
| 2016/0072669 A1 | 3/2016 | Saavedra |
| 2016/0087905 A1 | 3/2016 | Liu et al. |
| 2016/0119194 A1 | 4/2016 | Lopez et al. |
| 2016/0142287 A1* | 5/2016 | Yang .................. H04L 61/2596 370/392 |
| 2016/0173329 A1 | 6/2016 | Latham et al. |
| 2016/0191413 A1 | 6/2016 | Feroz et al. |
| 2016/0191521 A1 | 6/2016 | Feroz et al. |
| 2016/0212167 A1 | 7/2016 | Dotan et al. |
| 2016/0224789 A1 | 8/2016 | Feroz et al. |
| 2016/0226700 A1* | 8/2016 | Zhang ................. H04L 41/5041 |
| 2016/0232024 A1 | 8/2016 | Hamilton et al. |
| 2016/0234250 A1 | 8/2016 | Ashley et al. |
| 2016/0241389 A1 | 8/2016 | Saint et al. |
| 2016/0294923 A1 | 10/2016 | Fan et al. |
| 2016/0330138 A1 | 11/2016 | Thomason |
| 2016/0337236 A1* | 11/2016 | Hsu .................... H04L 29/12028 |
| 2016/0359658 A1 | 12/2016 | Yadav et al. |
| 2017/0063883 A1 | 3/2017 | Martinez |
| 2017/0063903 A1 | 3/2017 | Muddu et al. |
| 2017/0093664 A1 | 3/2017 | Lynam et al. |
| 2017/0099197 A1 | 4/2017 | Raney |
| 2017/0118241 A1 | 4/2017 | Call et al. |
| 2017/0126677 A1 | 5/2017 | Kumar et al. |
| 2017/0170990 A1 | 6/2017 | Gaddehosur et al. |
| 2017/0171143 A1 | 6/2017 | Ge et al. |
| 2017/0171159 A1 | 6/2017 | Kumar et al. |
| 2017/0230419 A1 | 8/2017 | Prafullchandra et al. |
| 2017/0264628 A1 | 9/2017 | Treat et al. |
| 2017/0302685 A1 | 10/2017 | Ladnai et al. |
| 2017/0317978 A1 | 11/2017 | Diaz-Cuellar et al. |
| 2018/0063160 A1 | 3/2018 | Kumar |
| 2018/0063194 A1 | 3/2018 | Vaidya et al. |
| 2018/0103011 A1 | 4/2018 | Li et al. |
| 2018/0159733 A1 | 6/2018 | Poon et al. |
| 2018/0159943 A1 | 6/2018 | Poon et al. |
| 2018/0181423 A1 | 6/2018 | Gunda et al. |
| 2018/0181754 A1 | 6/2018 | Gunda |
| 2018/0181763 A1 | 6/2018 | Gunda |
| 2018/0183759 A1 | 6/2018 | Gunda et al. |
| 2018/0183761 A1 | 6/2018 | Gunda et al. |
| 2018/0183764 A1 | 6/2018 | Gunda |
| 2018/0183866 A1 | 6/2018 | Gunda et al. |
| 2018/0191763 A1 | 7/2018 | Hillard et al. |
| 2018/0212788 A1* | 7/2018 | Iszlai .................. H04L 12/4641 |
| 2018/0212818 A1 | 7/2018 | Ide et al. |
| 2018/0241761 A1 | 8/2018 | Bania et al. |
| 2018/0351912 A1 | 12/2018 | Sengupta et al. |
| 2019/0034454 A1 | 1/2019 | Gangumalla et al. |
| 2019/0036956 A1 | 1/2019 | Gunda et al. |
| 2019/0075052 A1* | 3/2019 | Chirreddy ........... H04L 61/6022 |
| 2019/0149525 A1 | 5/2019 | Gunda et al. |
| 2019/0235934 A1 | 8/2019 | Chanda et al. |
| 2019/0238429 A1 | 8/2019 | Chanda et al. |
| 2019/0266004 A1 | 8/2019 | Kumar et al. |
| 2019/0394302 A1 | 12/2019 | Kristiansson et al. |
| 2020/0036608 A1 | 1/2020 | Chanda et al. |
| 2020/0225978 A1 | 7/2020 | Feroz et al. |
| 2020/0364074 A1 | 11/2020 | Gunda et al. |

FOREIGN PATENT DOCUMENTS

| | | |
|---|---|---|
| WO | 2008095010 A1 | 8/2008 |
| WO | 2013074828 A1 | 5/2013 |
| WO | 2014126574 A1 | 8/2014 |
| WO | 2016161799 A1 | 10/2016 |
| WO | 2018044352 A1 | 3/2018 |
| WO | 2018106612 A1 | 6/2018 |
| WO | 2018118465 A1 | 6/2018 |

OTHER PUBLICATIONS

Author Unknown, "Enabling Service Chaining on Cisco Nexus 1000V Series," Month Unknown, 2012, 25 pages, Cisco.

Author Unknown, "Next-Generation Firewalls," Month Unknown 2013, 1 page, Palo Alto Networks.

Basak, Debashis, et al., "Virtualizing Networking and Security in the Cloud," Month Unknown 2010, 9 pages, VMware, Inc., Palo Alto, CA.

Brownlee, N., et al., "Traffic Flow Measurement: Architecture," RFC 2722, Oct. 1999, 48 pages, The Internet Society.

Casado, Martin, et al., "SANE: A Protection Architecture for Enterprise Networks," Proceedings of the 15th USENIX Security Symposium, Jul. 31-Aug. 4, 2006, 15 pages, USENIX, Vancouver, Canada.

Deri, Luca, et al., "nDPI: Open-Source High-Speed Deep Packet Inspection," 2014 International Wireless Communications and Mobile Computing Conference (IWCMC), Aug. 4-8, 2014, 6 pages, IEEE, Nicosia, Cyprus.

Dixon, Colin, et al., "An End to the Middle," Proceedings of the 12th Conference on Hot Topics in Operating Systems, May 2009, 5 pages, USENIX Association, Berkeley, CA, USA.

Dumitriu, Dan Mihai, et al., (U.S. Appl. No. 61/514,990), filed Aug. 4, 2011, 31 pages.

Flegkas, Paris, et al., "On Policy-Based Extensible Hierarchical Network Management in QoS-Enabled IP Networks," Policy '01 Proceedings of the International Workshop on Policies for Distributed Systems and Networks, Jan. 29-31, 2011, 17 pages, Springer-Verlag, London, UK.

Guichard, J., et al., "Network Service Chaining Problem Statement," Network Working Group, Jun. 13, 2013, 14 pages, Cisco Systems, Inc.

Ioannidis, Sotiris, et al., "Implementing a Distributed Firewall;" CCS '00, Month Unknown 2000, 10 pages, ACM, Athens, Greece.

Johnson, Maritza L., et al., "Laissez-faire File Sharing: Access Control Designed for Individuals at the Endpoints," NSPW '09: Proceedings of the 2009 Workshop on New Security Paradigms Workshop, Sep. 8-11, 2009, 9 pages, ACM, Oxford, United Kingdom.

Joseph, Dilip Anthony, et al., "A Policy-aware Switching Layer for Data Centers," Jun. 24, 2008, 26 pages, Electrical Engineering and Computer Sciences, University of California, Berkeley, CA, USA.

Moshref, Masoud, et al., "vCRIB: Virtualized Rule Management in the Cloud," HotCloud'12, Jun. 12-13, 2012, 6 pages.

Nance, Kara, et al., "Virtual Machine Introspection: Observation or Interference?," IEEE Security and Privacy, Sep. 1, 2008, 6 pages, vol. 6, No. 5, IEEE Service Center, Los Alamitos, CA, US.

Non-Published Commonly Owned U.S. Appl. No. 16/739,572, filed Jan. 10, 2020, 32 pages, VMware, Inc.

Non-Published Commonly Owned U.S. Appl. No. 16/945,736 (N417.01.C1), filed Jul. 31, 2020, 98 pages, Vicira, Inc.

(56) References Cited

OTHER PUBLICATIONS

Non-Published Commonly Owned U.S. Appl. No. 17/063,415 (N094. C2), filed Oct. 5, 2020, 35 pages, Vicira, Inc.

Rubino, Roberto D., "An Open System for Transparent Firewall Authentication and User Traffic Identification within Corporate Intranets," SIGITE '08, Oct. 16-18, 2008, 5 pages, ACM, Cincinnati, OH, USA.

Scarfone, Karen, et al., "Guidelines on Firewalls and Firewall Policy: Recommendations of the National Institute of Standards and Technology," Special Publication 800-41, Revision 1, Sep. 2009, 48 pages, NIST, U.S. Department of Commerce.

Schulz-Zander, Julius, et al. "Realizing Software-Defined Wireless Networks: Acheiving Fine-Grained Wi-Fi Programmability with Off-the-Shelf Hardware," Apr. 20, 2016, 126 pages.

Sekar, Vyas, et al., "Design and Implementation of a Consolidated Middlebox Architecture," 9th USENIX Symposium on Networked Systems Design and Implementation, Apr. 25-27, 2012, 14 pages, USENIX, San Jose, CA, USA.

Sherry, Justine, et al., "Making Middleboxes Someone Else's Problem: Network Processing as a Cloud Service," In Proc. of SIGCOMM '12, Aug. 13-17, 2012, 12 pages, Helsinki, Finland.

Stojanovski, Nenad, et al., "Analysis of Identity Based Firewall Systems," Jun. 2010, 9 pages.

Stojanovski, Nenad, et al., "Architecture of a Identity Based Firewall System," Jul. 2011, 9 pages.

\* cited by examiner

FAST DISTRIBUTION OF PORT IDENTIFIERS FOR RULE PROCESSING

BACKGROUND

Several context-based service and forward architectures have been proposed in recent years. One of these architectures uses logical port identifiers associated with the machines as the contextual attributes used for performing match classification operations on service and/or forwarding rules. This architecture uses control plane (e.g., a cluster of controllers) to distribute the logical port identifiers. However, control plane distribution of logical port identifiers can be slow in some embodiments as it requires data to be first provided to the control plane, and then to be distributed from the control plane to host computers.

SUMMARY

Some embodiments of the invention provide a method for implementing a logical network with one or more logical forwarding elements (LFEs), each with multiple logical ports. Each LFE in some embodiments is implemented by several physical forwarding elements (PFEs) operating on several devices. On a host computer executing a particular machine connected to a PFE implementing a particular LFE, the method identifies an address discovery message associating a particular network address (e.g., a layer 2 (L2) address or media access control (MAC) address) of the particular machine with a another network address (e.g., a layer 3 (L3) or an Internet Protocol (IP) address) of the particular machine. The network addresses (e.g., L2 and L3 addresses) in some embodiments are defined in a logical address space of the logical network.

In some embodiments, the method identifies the address discovery message by identifying this message as the message traverses along the egress datapath of the particular machine. The address discovery message is different in different embodiments. For instance, in some embodiments, the address discovery message is an address resolution protocol (ARP) message (e.g., an ARP reply or gratuitous ARP message), while in other embodiments it is neighbor discovery (ND) message.

The method identifies an LFE logical port associated with the particular machine, and stores in an encapsulation header an identifier that identifies this port. The method encapsulates the address discovery data message with this encapsulation header. Different embodiments use different encapsulating headers. For instance, in some embodiments, the method uses a Generic Network Virtualization Encapsulation (GENEVE) header, and stores the logical port identifier in a Type-Length-Value (TLV) field of this header.

After encapsulating the data message, the method forwards the message to a set of one or more devices implementing the LFE. Each device in the set of devices extracts the logical port identifier from the encapsulation header and stores this logical port identifier for use in processing data messages associated with the particular machine. In some embodiments, the set of devices uses the logical port identifier to identify service or forwarding rules for performing service or forwarding operations on data messages to or from the particular machine. For instance, in some embodiments, the set of devices uses the logical port identifier to apply a security policy associated with the particular logical port to data messages to or from the particular machine.

In some embodiments, the set of devices includes a device that sends an address resolution request to identify one network address (e.g., an L2 or L3 address) of the particular machine based on another network address (e.g., an L3 or L2 address) of the particular machine. For instance, the device in some embodiments sends an address resolution protocol (ARP) request in order to identify a MAC address of the particular machine based on an IP address of the particular machine. In these embodiments, the message identified by the method is an ARP reply message that provides the MAC address for an IP address provided in the ARP request.

In other embodiments, the set of devices includes several devices that execute several machines connected to the LFE. The address discovery message in some of these embodiments is a gratuitous address discovery message that is sent when the particular machine connects to the LFE or receives an updated network address for the LFE. For instance, the gratuitous address discovery message in some embodiments is a gratuitous ARP message sent in response to a change of the particular machine's L3 network address from a previous IP address to an updated IP address. In some embodiments, the new or updated IP address is assigned by a dynamic host configuration protocol (DHCP) process or server to the particular machine.

When a device in some embodiments receives the encapsulated message with the logical port identifier stored in the encapsulating header, the device removes the encapsulating header, extracts the identifier from the header, and passes the address discovery message to its intended destination (e.g., a machine or module executing on the device). The device in some embodiments also identifies the IP address of the particular machine from the received message, and stores an association of the particular IP address with the logical-port identifier. When the received data message provides an updated address for the particular machine, the device replaces the previous IP address in the previously created association with the new IP address in order to associate the new IP address with the logical port identifier.

After creating or updating the association between the IP address and the logical port identifier, the device receives a data message with the particular IP address as a source or destination address. For such a message, the device uses the stored association to identify the logical-port identifier associated with the data message, uses the logical port-identifier to identify a service or forwarding rule associated with the particular logical port, and then performs a service or forwarding operation on the data message based on the identified service rule.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, the Detailed Description, the Drawings and the Claims is needed. Moreover, the claimed subject matters are not to be limited by the illustrative details in the Summary, the Detailed Description and the Drawing.

BRIEF DESCRIPTION OF FIGURES

The novel features of the invention are set forth in the appended claims. However, for purposes of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide a method for implementing a logical network with one or more logical forwarding elements (LFEs), each with multiple logical ports. Each LFE in some embodiments is implemented by several physical forwarding elements (PFEs) operating on several devices. On a host computer executing a particular machine connected to a PFE implementing a particular LFE, the method identifies an address discovery message associating a particular network address (e.g., a layer 2 (L2) address or media access control (MAC) address) of the particular machine with a another network address (e.g., a layer 3 (L3) or an Internet Protocol (IP) address) of the particular machine.

The method then identifies an LFE logical port associated with the particular machine, encapsulates the address discovery message with an encapsulation header that stores the identified LFE logical port, and forwards the encapsulated message to a set of one or more devices implementing the LFE. Each device in the set of devices extracts the logical port identifier from the encapsulation header and store this logical port identifier for use in processing data messages associated with the particular machine. This method allows for datapath distribution of mapping between a logical port identifier and its associated network addresses, which is much faster than the traditional method of distributing this information through the control plane.

As used in this document, data messages refer to a collection of bits in a particular format sent across a network. One of ordinary skill in the art will recognize that the term data message is used in this document to refer to various formatted collections of bits that are sent across a network. The formatting of these bits can be specified by standardized protocols or non-standardized protocols. Examples of data messages following standardized protocols include Ethernet frames, IP packets, TCP segments, UDP datagrams, etc. Also, as used in this document, references to L2, L3, L4, and L7 layers (or layer 2, layer 3, layer 4, and layer 7) are references respectively to the second data link layer, the third network layer, the fourth transport layer, and the seventh application layer of the OSI (Open System Interconnection) layer model.

Figure 1:
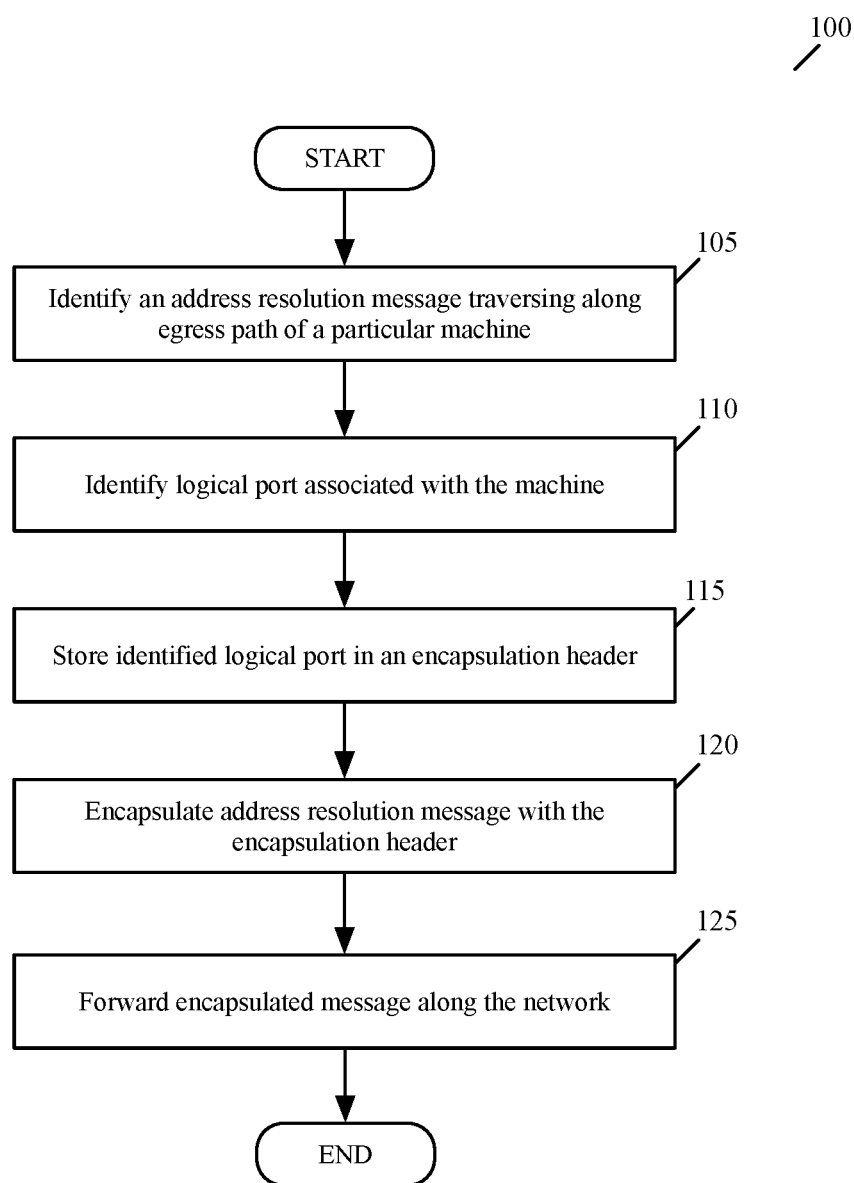
FIG. 1 illustrates a process of some embodiments of the invention.

FIG. 1 illustrates a process 100 of some embodiments of the invention. This process will be explained by reference to FIG. 2, which illustrates a network 200 with several machines 205 that execute on several host computers 210 along with several software switches 215. Each host computer has an encapsulator/decapsulator module 235, a service storage 275 and a service module 285. The network 200 also includes a cluster of gateways 270 and a cluster of controllers 280.

Figure 3:
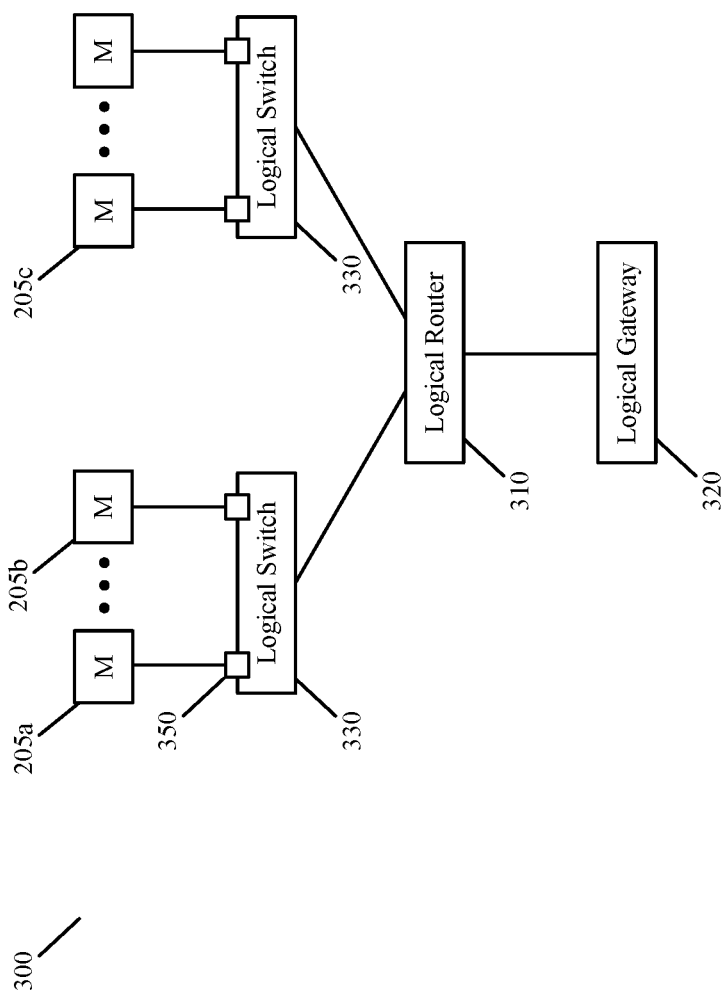
FIG. 3 illustrates an example of a logical switch, which is part of a logical network 300.

The software switches 215 on the host computers 210 implement one or more logical switches to which the machines 205 connect. Each host also executes a software router (not shown) that along with other software routers implements one or more logical routers. FIG. 3 illustrates a logical network 300 formed by two logical switches 330, one logical router 310 and one logical gateway 320. In some embodiments, the logical gateway is implemented by software gateways executing on host computers and/or hardware gateways operating as standalone devices. In some embodiments, multiple physical switches, routers and gateways are configured to implement one or more logical switches, logical routers and logical gateways by cluster of controllers 280, which provide part of the control plane functionality of the network.

The process 100 in some embodiments is performed by the encapsulator/decapsulator module 235 called by an uplink port 230 of a software switch 215 executing on a host computer. As shown, the process 100 starts when the process identifies (at 105) an address discovery message that associates a particular layer 2 (L2) network address (e.g., a MAC address) of a particular machine 205 executing on the same host computer 210 with a layer 3 (L3) network address (e.g., an IP address) of the particular machine 205. The L2 and L3 addresses in some embodiments are defined in a logical address space of the logical network. The address discovery message is different in different embodiments. For instance, in some embodiments, the address discovery message is an address resolution protocol (ARP) message (e.g., an ARP reply or gratuitous ARP message), while in other embodiments it is neighbor discovery (ND) message.

In some embodiments, the process identifies the address discovery message as the message traverses along an egress datapath of the particular machine. For instance, in some embodiments, the identified address discovery message is sent by a machine 205a executing on a host computer 210a in response to an ARP or ND request received by the machine. In other embodiments, the address discovery message is a gratuitous address discovery message when a new or updated IP address has been assigned to the machine 205a. In some embodiments, another module (i.e., a module other than the machine 205a) executing on the host computer 210a sends the address discovery message when a new or updated IP address is assigned to the machine 205a.

In some embodiments, the encapsulator 235a executing on host computer 210a identifies the address discovery message associated with the machine 205a by receiving a notification from the uplink port 230a on this computer 210a. In these embodiments, the encapsulator 235a registers a hook with the uplink port 230a to have this port call the encapsulator to examine each address discovery message received at the uplink port for passing to the computer's NIC (not shown) for forwarding along the physical network 295. In other embodiments, the hook is set to provide to the encapsulator 235a each data message received at the uplink port, or the first set of one or more data messages of a flow received at the uplink port.

The uplink port 230a or the encapsulator 235a determines that a data message is an address discovery message based on header values of the data message (e.g., the header values that indicate that the data message is an ARP reply message, a gratuitous ARP message or an ND message). In the embodiments that the encapsulator is notified of the data messages received at the uplink port 230a, the encapsulator 235a examines the identified message to determine whether the message is an address discovery message. If the data message is not an address discovery message, the encapsulator does not perform the process 100.

For the particular machine with which the address discovery message is associated, the process identifies (at 110) a logical port of the logical switch to which the particular machine connects. For instance, in the examples illustrated in FIGS. 2 and 3, the encapsulator identifies the logical port 350 of the logical switch 330 as the logical port associated with the machine 205a that is associated with the address discovery message identified at 105. This logical port 350 corresponds to the port 250a of switch 215a of the host computer 210a. The uplink port 230a in some embodiments identifies this logical port by using the source IP address and/or source MAC address to lookup a record on the host computer 210a that associated one or both of these addresses with the identifier of the logical port.

Figure 4:
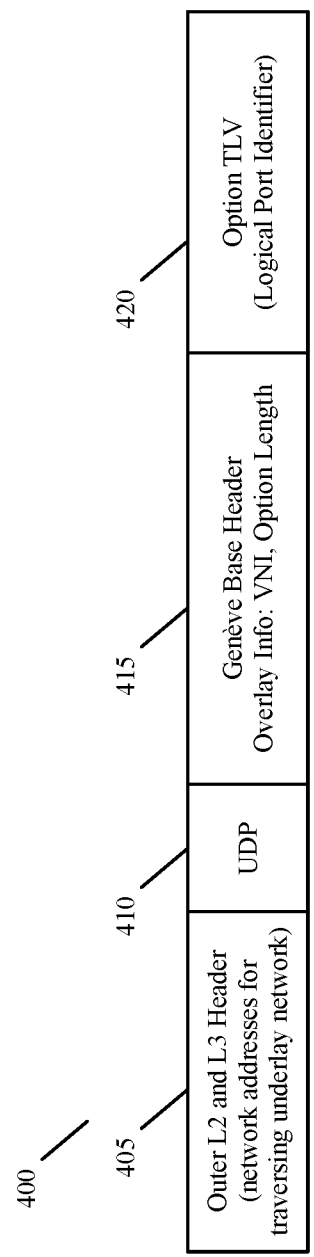
FIG. 4 illustrates a Generic Network Virtualization Encapsulation (GENEVE) header.

At 115, the process stores the identified logical port identifier in an encapsulation header that it uses to encapsulate the identified address discovery message. Different embodiments use different encapsulating headers. For instance, in some embodiments, the process uses a Generic Network Virtualization Encapsulation (GENEVE) header 400 illustrated in FIG. 4, and stores the logical port identifier in a Type-Length-Value (TLV) field 420 of this header 400. As shown, the tunnel header 400 includes an outer header 405, a protocol field 410, a Geneve base header 415, and an option TLV 420.

The outer portion 405 of the tunnel header 400 includes the network addresses (e.g., source and destination IP addresses of the two endpoints of the tunnel, with the source and destination designation depending on the direction of the message flow) in the underlay network that allow the encapsulated data message to traverse the underlay network and reach the tunnel destination endpoint. The protocol field 410 specifies a UDP protocol as well as attributes associated with this protocol. The option TLV 420 includes a four-byte option header and a variable amount of option data interpreted according to the option type. The option data in some embodiments includes the identified logical port identifier.

After defining the encapsulation header at 115, the process encapsulates (at 120) the address discovery message with this header, and then forwards (at 125) the encapsulated message to a set of one or more destination devices for this message. For instance, in the example illustrated in FIG. 2, the encapsulator 235a encapsulates the address discovery message associated with the machine 205a, and directs the uplink port 230a to pass this message to the NIC (not shown) of the host computer 210a for forwarding along the physical network 295.

In some cases, the encapsulated data message has one destination and thereby is addressed to one destination device, while in other cases the encapsulated data message has multiple destinations and is a broadcast or multi-case message addressed to multiple destination devices. For example, in some embodiments, the set of destination devices includes a machine 205b that sends an ARP request to identify a MAC address associated with an IP address of the machine 205a. In these embodiments, the address discovery message is an ARP reply message that provides the MAC address for the IP address provided in the ARP request.

In some embodiments, the set of destination devices can include several devices that execute several machines connected to the LFE. The address discovery message in some embodiments is a gratuitous address discovery message that is sent when the particular machine (e.g., machine 205a) receives a new or updated network address for an LFE (e.g., logical switch 330) to which the machine connects. For instance, the gratuitous address discovery message in some embodiments is a gratuitous ARP message sent in response to a change of the IP address of machine 205a from a previous IP address to an updated IP address. In some embodiments, the machine that gets the new or updated IP address is the machine that sends the gratuitous address discovery message, while in other embodiments a module executing on the same host computer as this machine sends this message. In some embodiments, the new or updated IP address is assigned to the particular machine by a dynamic host configuration protocol (DHCP) process or server.

In some embodiments, the set of devices that receive the encapsulated address discovery message can also include controllers 280 and gateways 270. When the encapsulated address discovery message is for just one destination, the message is a unicast message that has a single destination address associated with one network node (e.g., one machine). On the other hand, when the encapsulated address discovery message has multiple destinations, the message in some embodiments is a broadcast or multi-case message addressed to broadcast or multi-cast address that is associated with multiple network nodes.

In the set of devices that receives the encapsulated address discovery message, each device in some embodiments extracts the logical port identifier from the encapsulation header and stores this logical port identifier for use in processing data messages associated with the particular machine. In some embodiments, the device uses the logical port identifier to identify service or forwarding rules for performing service or forwarding operations on data messages to or from the particular machine. For instance, in some embodiments, the set of devices uses the logical port identifier to apply a security policy (associated with the particular logical port) to data messages to or from the particular machine.

Figure 5:
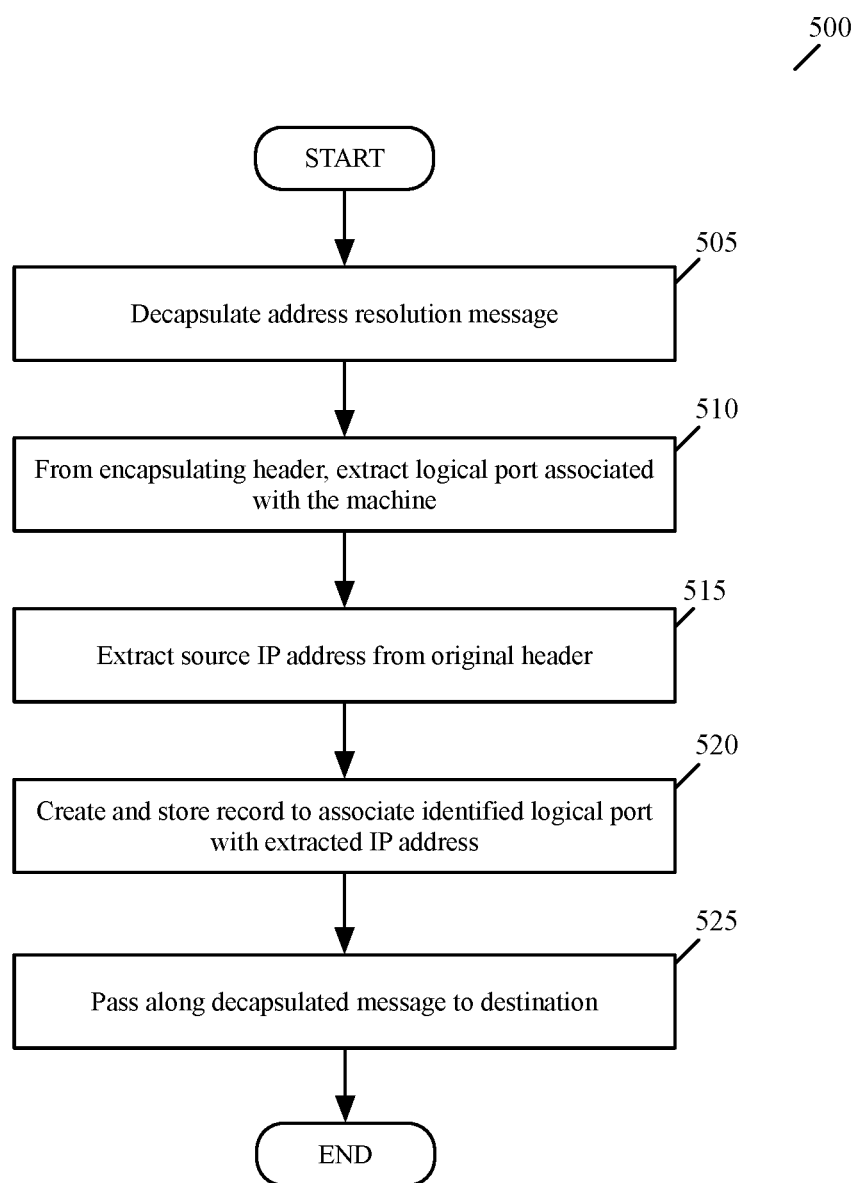
FIG. 5 illustrates a process that a device in some embodiments performs when it receives an encapsulated address discovery message with the logical port identifier stored in the encapsulating header.

FIG. 5 illustrates a process 500 that a device in some embodiments performs when it receives an encapsulated address discovery message with the logical port identifier stored in the encapsulating header. In some embodiments, the process 500 is performed by the encap/decap processor 235 on a host computer that executes a machine that is the destination of the address discovery message. For instance, when the machine 205b on host computer 210b is the destination for an ARP reply (e.g., when the machine 205b sent an ARP request packet) or a gratuitous ARP packet, the encap/decap processor 235b performs the process 500 after the uplink port 230b receives the data message from the MC on this host computer and calls the encap/decap processor 235b.

As shown in FIG. 5, the process 500 initially removes (at 505) the encapsulating header from the received message, and extracts (at 510) the logical-port identifier from this header. It also extracts (at 515) the source IP address from the received address discovery message. This IP address is the IP address of the machine (e.g., machine 205a) connected to the logical port (e.g., the logical port 350) identified by the extracted logical port identifier.

Next, at 520, the process creates a record associating the extracted IP address with the extracted logical-port identifier, and stores this record in a mapping storage structure (e.g., storage 275b on host computer 210b). When the received data message provides an updated address for the particular machine, the device replaces the previous IP address in the previously created record with the new IP address in order to associate the new IP address with the logical port identifier. After creating or updating the record associating the extracted IP address and logical-port identifier, the process 500 passes (at 525) the decapsulated address discovery message to its destination (e.g., the encap/decap processor 235b passes the decapsulated ARP or ND packet back to the uplink port 230b so that it can pass this message to the destination machine 205b through the software switch 215b), and then ends.

Figure 2:
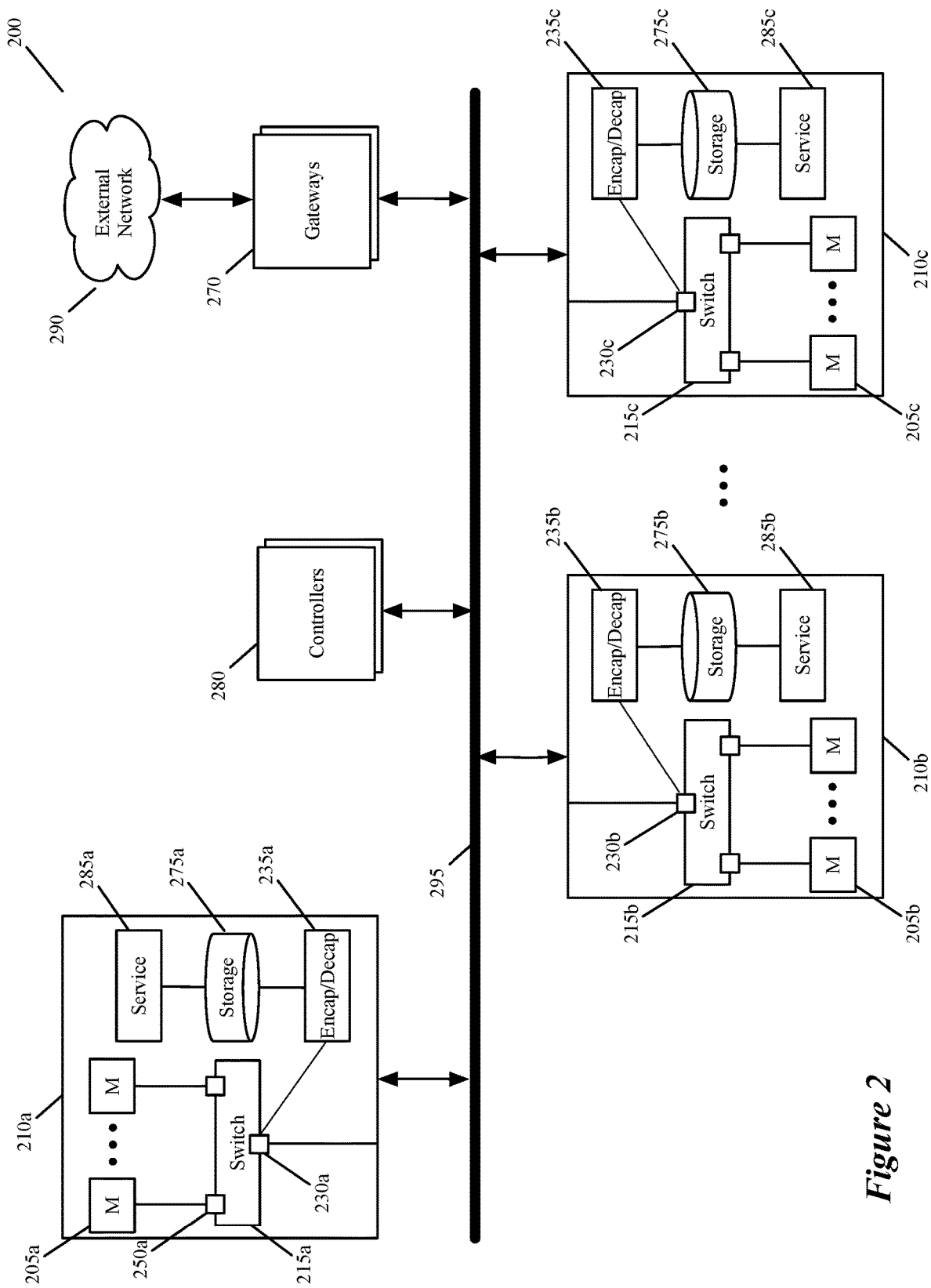
FIG. 2 illustrates several machines that execute on several host computers along with several software switches that implement a logical switch.

The record created or updated at 520 is used subsequently to perform service and/or forwarding operations on the device that receives the encapsulated address discovery message in some embodiments. For instance, as shown in FIG. 2, a service engine 285b in some embodiments accesses the mapping storage structure 275b to identify the logical-port identifier associated with a data message that the service engine receives after the record is created or updated at 520. The service engine in some embodiments uses the received data message's source or destination IP address as an index into the mapping storage structure to identify the logical-port identifier associated with this IP address.

Figure 6:
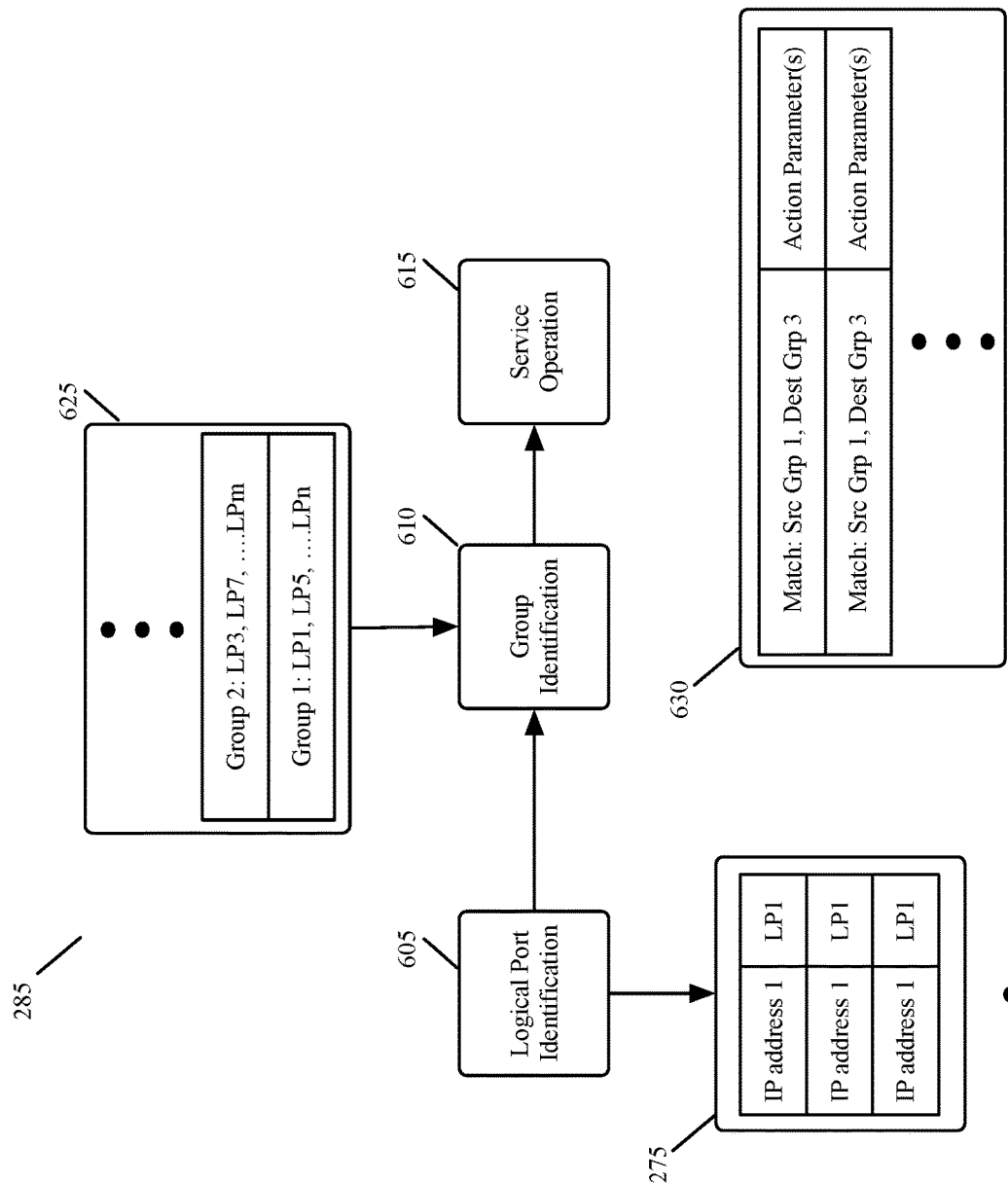
FIG. 6 illustrates an example of a service engine identifying and using a logical-port identifier to perform a service operation.

The service engine then uses the logical-port identifier retrieved from the mapping storage structure to perform a classification operation that matches the logical-port identifier with a set of match attributes of a service or forwarding rule that specifies a service or forwarding action for the engine to perform. FIG. 6 illustrates an example of such a classification operation. This figure illustrates a service engine 285 that includes a logical port identifying module 605, a group identifying module 610 and a service module 615.

The logical port identifying module 605 matches the source IP addresses and/or destination IP addresses of data messages with records in the mapping data storage 275, in order to identify source logical ports and/or destination logical ports that associates with these IP addresses. It then provides any identified logical port identifier(s) to the group identification module 610. The module 610 then matches the received logical port identifier(s) with records in a group identifier storage 625 that provides the group identifier for each logical port identifier. For each group, the group identifier storage in some embodiments includes a group member list that includes the logical port identifiers in that group.

After a source group identifier and/or a destination group identifier has been identified for a data message, the service operation then uses the source and destination group identifiers to identify the service rule to execute. The service engine uses service rules stored in a service rule storage 630 to perform service operations. Each service rule has (1) a set of match criteria defined in terms of one or more data message attributes, such as L2-L4 header values, group identifiers, contextual attributes, etc., and (2) one or more action parameters that specify the action that the service engine has to perform on a matching data message. FIG. 6 shows several service rules, each of which has a set of match criteria defined in terms of group identifiers. After matching a service rule match criteria with one or more logical port identifiers that it identifies for a data message, the service engine performs a service operation on the data message based on the matching service rule's action parameter.

In other embodiments, the records in the mapping-storage structure 275 are used to pre-process and convert service or forwarding rules that have match attributes defined in terms of logical port identifiers to service or forwarding rules that have match attributes defined in terms of IP addresses. In other embodiments, the service or forwarding rules are initially defined in terms of group identifiers, which are in turn defined in terms of one or more logical port identifiers. In some of these embodiments, the records in the mapping-storage structure are used to pre-process and convert service or forwarding rules that have match attributes defined in terms of group identifiers to service or forwarding rules that have match attributes defined in terms of IP addresses. In this pre-processing, the group identifiers are first resolved to their associated logical-port identifiers, which are then resolved to their IP addresses based on the records in the mapping storage structure.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 7:
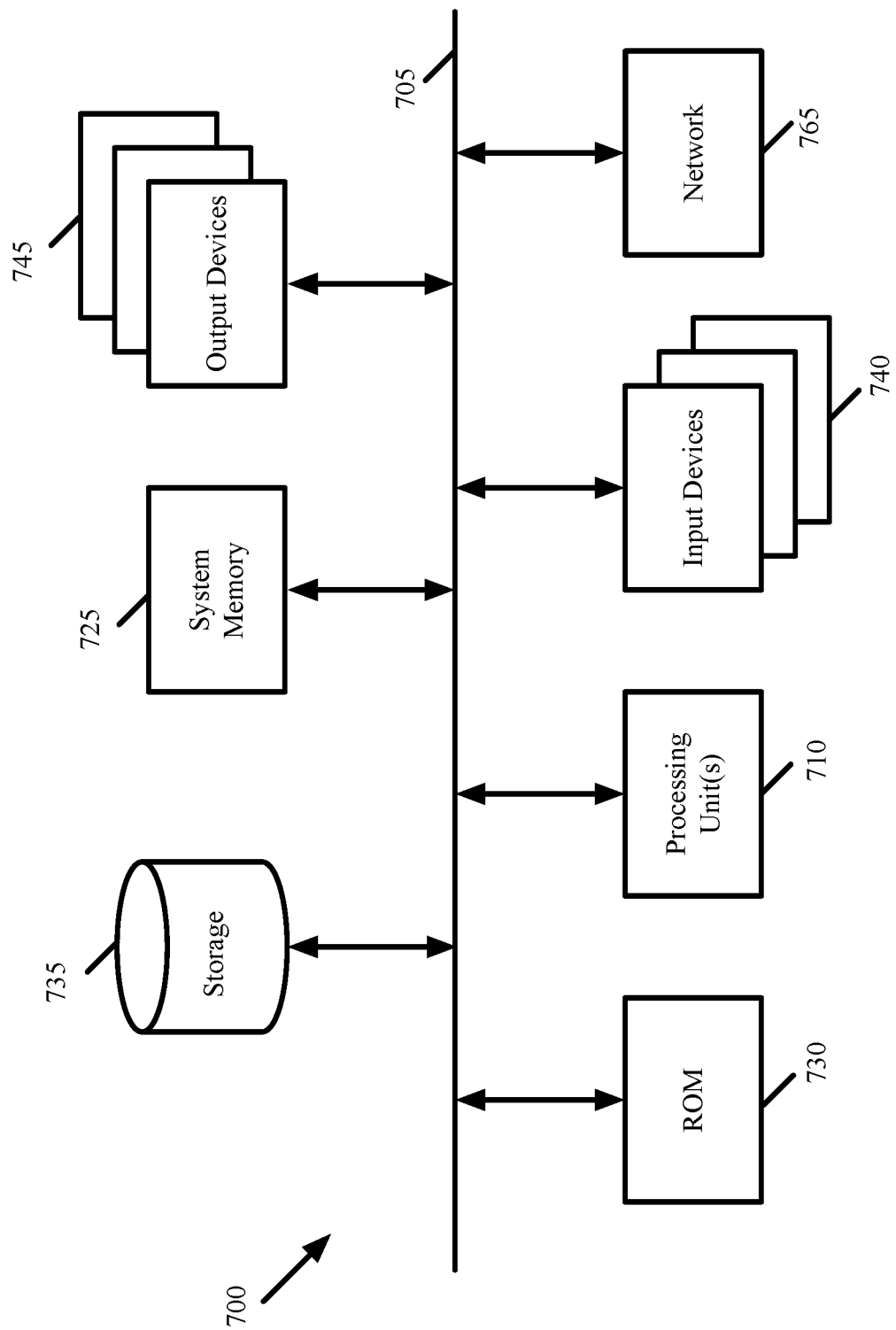
FIG. 7 illustrates a computer system used for some embodiments of the invention.

FIG. 7 conceptually illustrates a computer system 700 with which some embodiments of the invention are implemented. The computer system 700 can be used to implement any of the above-described hosts, controllers, and managers. As such, it can be used to execute any of the above described processes. This computer system includes various types of non-transitory machine readable media and interfaces for various other types of machine readable media. Computer system 700 includes a bus 705, processing unit(s) 710, a system memory 725, a read-only memory 730, a permanent storage device 735, input devices 740, and output devices 745.

The bus 705 collectively represents all system, peripheral, and chipset buses that communicatively connect the numerous internal devices of the computer system 700. For instance, the bus 705 communicatively connects the processing unit(s) 710 with the read-only memory 730, the system memory 725, and the permanent storage device 735.

From these various memory units, the processing unit(s) 710 retrieve instructions to execute and data to process in order to execute the processes of the invention. The processing unit(s) may be a single processor or a multi-core processor in different embodiments. The read-only-memory (ROM) 730 stores static data and instructions that are needed by the processing unit(s) 710 and other modules of the computer system. The permanent storage device 735, on the other hand, is a read-and-write memory device. This device is a non-volatile memory unit that stores instructions and data even when the computer system 700 is off. Some embodiments of the invention use a mass-storage device (such as a magnetic or optical disk and its corresponding disk drive) as the permanent storage device 735.

Other embodiments use a removable storage device (such as a floppy disk, flash drive, etc.) as the permanent storage device. Like the permanent storage device 735, the system memory 725 is a read-and-write memory device. However, unlike storage device 735, the system memory is a volatile read-and-write memory, such as random access memory. The system memory stores some of the instructions and data that the processor needs at runtime. In some embodiments, the invention's processes are stored in the system memory 725, the permanent storage device 735, and/or the read-only memory 730. From these various memory units, the processing unit(s) 710 retrieve instructions to execute and data to process in order to execute the processes of some embodiments.

The bus 705 also connects to the input and output devices 740 and 745. The input devices enable the user to communicate information and select requests to the computer system. The input devices 740 include alphanumeric keyboards and pointing devices (also called "cursor control devices"). The output devices 745 display images generated by the computer system. The output devices include printers and display devices, such as cathode ray tubes (CRT) or liquid crystal displays (LCD). Some embodiments include devices such as touchscreens that function as both input and output devices.

Finally, as shown in FIG. 7, bus 705 also couples computer system 700 to a network 765 through a network adapter (not shown). In this manner, the computer can be a part of a network of computers (such as a local area network ("LAN"), a wide area network ("WAN"), or an Intranet), or a network of networks (such as the Internet). Any or all components of computer system 700 may be used in conjunction with the invention.

Some embodiments include electronic components, such as microprocessors, that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms "display" or "displaying" mean displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. For instance, in some embodiments, the logical port identifiers are used for other purposes than those described above. In some embodiments, the logical port identifiers are used as machine (VM or Pod) identifiers that are used to perform any number of forwarding or middlebox operations associated with the machines. Also, in some embodiments, other attributes of the machines are forwarded through the encapsulation headers that are used to forward the address discovery messages (e.g., the ARP replies, gratuitous ARP messages, ND messages, etc.). Thus, one of ordinary skill in the art would understand that the invention is not to be limited by the foregoing illustrative details, but rather is to be defined by the appended claims.

We claim:

1. A method for managing a logical forwarding element (LFE) implemented by a plurality of physical forwarding elements (PFEs) operating on a plurality of devices, the LFE comprising a set of logical ports, the method comprising:
    on a host computer executing a particular machine connected to the LFE and a PFE implementing the LFE:
        identifying an address discovery message associating first network address of the particular machine with second network address of the machine;
        identifying an LFE logical port associated with the particular machine;
        storing an identifier of the identified logical port in an encapsulation header;
        forwarding the address discovery message encapsulated with the encapsulation header to a set of one or more devices implementing the LFE for the devices to use in processing data messages associated with the particular machine.

2. The method of claim 1, wherein the set of devices use the logical port identifier to identify service or forwarding rules for performing a service operation or a forwarding operation on data messages to or from the particular machine.

3. The method of claim 1, wherein the set of devices use the logical port identifier to apply a security policy associated with the particular logical port to data messages to or from the particular machine.

4. The method of claim 1, wherein identifying the address discovery message comprises receiving the address discovery message from the particular machine.

5. The method of claim 1, wherein the set of devices comprises one device that sent an address resolution request to identify one network address of the particular machine based on another network address of the particular machine.

6. The method of claim 5, wherein the message is an address resolution protocol (ARP) reply message, and the address resolution request is an ARP request message sent by the device in order to identify a MAC address of the particular machine based on an IP address of the particular machine.

7. The method of claim 1, wherein the set of devices comprises a plurality of devices that execute a plurality of machines connected to the LFE, the address discovery message being a gratuitous address discovery message that is sent when particular machine connects to the LFE or receives an updated network address for the LFE.

8. The method of claim 1, wherein the first network address is a layer 2 network address while the second network address is a layer 3 network address.

9. The method of claim 8, wherein the gratuitous address discovery message is a gratuitous ARP message sent in response to a change of the particular machine's layer 3 network address from a previous IP address to an updated IP address.

10. The method of claim 8, wherein the LFE is part of a logical network defined over a shared physical network, and the layers 2 and 3 network addresses are defined in layers 2 and 3 network addresses space of the logical network.

11. A non-transitory machine readable medium storing a program for execution by at least one processing unit of a host computer and for managing a logical forwarding element (LFE) implemented by a plurality of physical forwarding elements (PFEs) operating on a plurality of devices, the LFE comprising a set of logical ports, the host computer executing (i) a particular machine connected to the LFE and (ii) a PFE implementing the LFE, the program comprising sets of instructions for:

identifying an address discovery message associating first network address of the particular machine with second network address of the machine;

identifying an LFE logical port associated with the particular machine;

storing an identifier of the identified logical port in an encapsulation header;

forwarding the address discovery message encapsulated with the encapsulation header to a set of one or more devices implementing the LFE for the devices to use in processing data messages associated with the particular machine.

12. The non-transitory machine readable medium of claim 11, wherein the set of devices use the logical port identifier to identify service or forwarding rules for performing a service operation or a forwarding operation on data messages to or from the particular machine.

13. The non-transitory machine readable medium of claim 11, wherein the set of devices use the logical port identifier to apply a security policy associated with the particular logical port to data messages to or from the particular machine.

14. The non-transitory machine readable medium of claim 11, wherein identifying the address discovery message comprises receiving the address discovery message from the particular machine.

15. The non-transitory machine readable medium of claim 11, wherein the set of devices comprises one device that sent an address resolution request to identify one network address of the particular machine based on another network address of the particular machine.

16. The non-transitory machine readable medium of claim 15, wherein the message is an address resolution protocol (ARP) reply message, and the address resolution request is an ARP request message sent by the device in order to identify a MAC address of the particular machine based on an IP address of the particular machine.

17. The non-transitory machine readable medium of claim 11, wherein the set of devices comprises a plurality of devices that execute a plurality of machines connected to the LFE, the address discovery message being a gratuitous address discovery message that is sent when particular machine connects to the LFE or receives an updated network address for the LFE.

18. The non-transitory machine readable medium of claim 11, wherein the first network address is a layer 2 network address while the second network address is a layer 3 network address.

19. The non-transitory machine readable medium of claim 18, wherein the gratuitous address discovery message is a gratuitous ARP message sent in response to a change of the particular machine's layer 3 network address from a previous IP address to an updated IP address.

20. The non-transitory machine readable medium of claim 18, wherein the LFE is part of a logical network defined over a shared physical network, and the layers 2 and 3 network addresses are defined in layers 2 and 3 network addresses space of the logical network.

* * * * *